United States Patent Office 3,745,153
Patented July 10, 1973

3,745,153
PROCESS FOR THE PREPARATION OF POLYTHIO-ESTEROXIMES AND POLYBENZOTHIAZOLE (PBT) TYPE POLYMERS DERIVED THEREFROM
Carl N. Zellner, New Hope, Pa., assignor to Celanese Corporation, New York, N.Y.
No Drawing. Filed Oct. 30, 1970, Ser. No. 85,751
Int. Cl. C08g 33/02
U.S. Cl. 260—79
21 Claims

ABSTRACT OF THE DISCLOSURE

Process for the preparation of polymers which comprises reacting at temperatures of from about 0° to about 250° C. an aromatic dithiol or its alkali metal or Group IIa or IIb metal di-salt with a bis(hydroxamoyl halide) or a derivative thereof to form a polythioesteroxime, which may then be subjected to ring closing conditions which may then be subjected to riny closing conditions to form polybenzothiazole (PBT) type polymers. Formation of the polythioesteroxime is preferably conducted in the presence of a solvent, which may or may not also function as an acid-acceptor; if not, then preferably also in the presence of an acid-acceptor. The preferred acid-acceptors are those which are insoluble in the reaction mixture—most preferably melamine. The ring closure may be conducted in the presence of a catalyst at temperatures of from about 0° to about 250° C. or by reaction with a sulfonyl halide at temperatures of from about 0° to about 90° C. Reactive mercapto or hydroxamoyl halide terminal groups of the polythioesteroximes, or PBT type polymers, may be reacted with other compounds or polymers which contain groups reactive therewith in order to further extend the polymer chains. In a preferred prior step, aromatic bis(hydroxamoyl halide) reactants are made by the reaction of dialkyl aromatic precursors, e.g., any of the isomers of xylene, with, e.g., nitrosyl halide.

---

This invention relates to a novel process for the preparation of polythioesteroximes and to polybenzothiazole (PBT) type polymers produced therefrom.

Polythioesteroximes are useful as chelating agents for sequestering polyvalent metal ions in plating baths, polluted streams, etc. The polymers are also useful as catalyst carriers and as ion-exchange resins. The polymers may be formed into fibers, films, molded articles, etc. Instead of undergoing ring closure to form the PBT type polymers of this invention, the polythioesteroximes may be hydrolyzed to high performance polythioesters by reaction with, e.g., dilute hydrochloric acid, or their oxime groups may be hydrogenated under appropriate conditions to amine groups to form polyamines, which are also useful as chelating agents. The polyamines may be reacted with polyepoxides to form epoxy resins and molded articles, or they may be cross linked with dicarboxylic acids to form polyamide resins of interesting and varied properties.

The PBT polymers of this invention generally are useful for applications where high performance polymers are required. For example, in aerospace applications where retention of strength at elevated temperatures and flame retardancy are required, the PBT polymers of this invention are outstanding. Heretofore, Nomex® polyamide type resins have been used in coveralls, etc. worn by pilots and race car drivers to protect against injuries from fires resulting from crashes, etc. Unfortunately, Nomex® garments are not as non-flammable as desired. In addition, wearers of these garments have complained that they are clammy, especially when worn in a close cockpit. PBT type polymers are much less flammable than Nomex® resins. Garments made from PBT type polymers are not clammy, especially when the fabric in the garment is woven from staple, which fabric has the feel of cotton.

Heretofore, PBT type polymers have been made by the reaction of an aromatic dimercapto-diamino compound with a dicarboxylic acid or a derivative thereof. Over-all this process is undesirable because it is expensive and also because of toxicity problems. The dimercapto-diamino compound is difficult to synthesize and difficult to purify, thereby resulting in a very expensive starting material. The other starting material is usually isophthaloyl chloride.

One or more of the foregoing and other adverse effects of the prior art process are overcome by the novel process of the present invention.

Generally, the process of the present invention comprises reacting an aromatic dimercapto-compound with a bis(hydroxamoyl halide) or a derivative thereof to form the polythioesteroxime, which may then be subjected to ring closing conditions to form the PBT type polymers of this invention.

Illustrative of the aromatic dimercapto-compounds or their alkali metal or Group IIa or IIb metal di-salts which may be used in the present invention are those which may be depicted by the following general formula:

MS—Y—SM wherein M is hydrogen, or an alkali metal or Group IIa or IIb metal; Y is —C$_6$H$_4$—, —C$_{10}$H$_6$—, —C$_{14}$H$_8$—, —C$_6$H$_4$—C$_6$H$_4$—, —C$_6$H$_4$—R—C$_6$H$_4$, wherein R is as defined below, and the like. Y may be substituted with groups which do not detrimentally interfere with the reaction.

Illustrative subcategories of the sulfhydryl (or mercapto) compounds which may be used are:
(I) Compounds of the general formula

MS—Z—SM wherein M is as described above and wherein Z is —C$_6$H$_4$—, C$_{10}$H$_6$—, C$_{14}$H$_8$—; 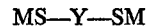
(II) Compounds of the general formula

MS—C$_6$H$_4$—C$_6$H$_4$—SM wherein M is as described above; and
(III) Compounds of the general formula

MS—C$_6$H$_4$—R—C$_6$H$_4$—SM wherein M is as described above and R may be

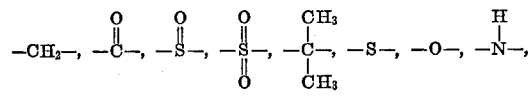

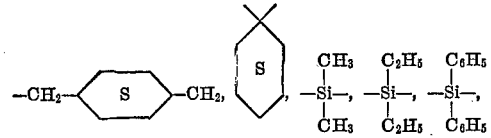

or the like.

In each of the above formulas, it is preferred that M be M', M' being an alkali metal or a Group IIa or IIb metal. Preferred alkali metals are lithium, sodium and potassium. Preferred Group IIa and IIb metals are magnesium, strontium, barium, calcium and zinc.

Sodium is most preferred as M' and sodium biphenyl-p,p'-dimercaptide is the most preferred salt.

Illustrative of particular aromatic dimercapto compounds which may be used in the process of this invention are the following:

1,2-dimercapto benzene
1,3-dimercapto benzene
1,4-dimercapto benzene
1,4-dimercapto naphthalene
1,5-dimercapto naphthalene
1,6-dimercapto naphthalene
1,7-dimercapto naphthalene
1,8-dimercapto naphthalene
2,3-dimercapto naphthalene
2,6-dimercapto naphthalene
2,7-dimercapto naphthalene
1,4-dimercapto-2-methyl-naphthalene
1,4-dimercapto-anthracene
2,6-dimercapto-anthracene
9,10-dimercapto-anthracene
9-10-dimercapto-phenanthrene
2,2'-dimercapto-biphenyl
2,4'-dimercapto-biphenyl
3,3'-dimercapto-biphenyl
3,4'-dimercapto-biphenyl
4,4'-dimercapto-biphenyl
4,4'-dimercapto-2,2'-dimethyl-biphenyl
1,1-bis(4-mercaptophenyl)cyclohexane
bis(4-mercaptophenyl) dimethyl silane
bis(4-mercaptophenyl) diethyl silane
bis(4-mercaptophenyl) diphenyl silane
bis(4-mercaptophenyl) amine
bis(4-mercaptophenyl) ether, i.e., 4,4'-dimercapto diphenyl ether
bis(4-mercaptophenyl) thioether
2,2-bis(4-mercaptophenyl) propane
bis(4-mercaptophenyl) sulfoxide
bis(4-mercaptophenyl) ketone
bis(4-mercaptophenyl) methane It is preferable to use the dithiols in the form of their di-salts, rather than the dithiols per se. Illustrative of the di-salts are the following:

disodium salt of 1,2-dimercapto benzene
dipotassium salt of 1,3-dimercapto benzene
disodium salt of 1,4-dimercapto benzene
dipotassium salt of 1,4-dimercapto naphthalene
disodium salt of 1,5-dimercapto naphthalene
dipotassium salt of 1,6-dimercapto naphthalene
disodium salt of 1,7-dimercapto naphthalene
dipotassium salt of 1,8-dimercapto naphthalene
disodium salt of 2,3-dimercapto naphthalene
dipotassium salt of 2,6-dimercapto naphthalene
disodium salt of 1,4-dimercapto-2-methyl-naphthalene
dipotassium salt of 1,4-dimercapto-anthracene
disodium salt of 2,6-dimercapto-anthracene
dipotassium salt of 9,10-dimercapto anthracene
disodium salt of 9,10-dimercapto phenanthrene
dipotassium salt of 2,2'-dimercapto-biphenyl
disodium salt of 2,4'-dimercapto-biphenyl
dipotassium salt of 3,3'-dimercapto-biphenyl
disodium salt of 3,4'-dimercapto-biphenyl
dipotassium salt of 4,4'-dimercapto-biphenyl
disodium salt of 4,4'-dimercapto-2,2'-dimethyl-biphenyl
dipotassium salt of 1,1-bis(4-mercapto phenyl) cyclohexane
disodium salt of bis(4-mercapto phenyl) dimethyl silane
dipotassium salt of bis(4-mercapto phenyl) diethyl silane
disodium salt of bis(4-mercapto phenyl) diphenyl silane
dipotassium salt of bis(4-mercapto phenyl)amine
disodium salt of bis(4-mercapto phenyl) ether
dipotassium salt of bis(4-mercapto phenyl) thioether
disodium salt of 2,2-bis(4-mercapto phenyl) propane
dipotassium salt of bis(4-mercapto phenyl) sulfone
disodium salt of bis(4-mercapto phenyl) sulfoxide
dipotassium salt of bis(4-mercapto phenyl) ketone
disodium salt of bis(4-mercapto phenyl) methane By the term "aromatic dimercapto compound" is meant a compound in which the two sulfhydryl groups are each attached to an aromatic ring, not necessarily both attached to the same ring, however. Generally, an aromatic dithiol containing up to about 30 carbon atoms can be used in the present invention. Preferably the dithiol contains up to about 20 carbon atoms, most preferably up to about 15 carbon atoms. The most preferred dithiol is p,p'-dimercapto biphenyl.

Although the dithiol per se may be used in the reaction, it is highly desirable to use the dithiol in the form of its alkali metal salt, especially its lithium, sodium or potassium salt. The sodium and potassium salts are preferred.

The alkali metal salts may be formed by reacting, e.g., the alkali metal hydroxide with the aromatic dithiol in aqueous solution or suspension. It is preferred that the di-salt so formed be dried before use. The isolation and drying may be accomplished in any convenient and effective method which occurs to one skilled in the art. For example, the salt may be precipitated from solution by addition of a thiol to the reaction mixture, the precipitate may be washed with ether and then dried in an oven. Alternatively, the reaction mixture may be dried to a slurry and then the remaining water azeotropically distilled with cyclohexanone or any other solvent with which water forms a useful azeotrope. These solvents are readily ascertained from available published tables of azeotropes.

Bis(hydroxamoyl halides) which may be used in this invention may be either aliphatic or aromatic and may be, e.g., the chlorides, bromides, or iodides. The chlorides and bromides are generally preferred. Derivatives of those compounds, e.g., the O-sulfonates may be used instead. The compounds are illustrated by the following formula:

$$\begin{array}{c} X \\ \diagdown \\ X'ON \end{array} C-R'-C \begin{array}{c} X \\ \diagup \\ NOX' \end{array}$$

wherein X is halogen; or —OR", —SR" (R" is alkyl of up to 4 carbon atoms), or —OC$_6$H$_5$; and R' is a direct bond or a divalent aliphatic, aromatic or organosilicon group; and X' is hydrogen or an

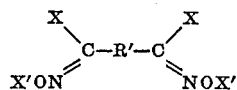

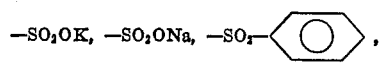

(R" is alkyl of up to 4 carbon atoms),

group. Illustrative of the aliphatic groups represented by R' are —CH$_2$—, —C$_2$H$_4$—, —C$_3$H$_6$—, —C$_4$H$_8$—, and the like. Illustrative of the organosilicon groups are

and the like. Illustrative of the aromatic groups represented by R' are —C$_6$H$_4$—, —C$_6$H$_4$·C$_6$H$_4$—, —C$_{10}$H$_6$—, —C$_{14}$H$_8$—, (—C$_6$H$_4$—)$_2$ R", wherein R" is

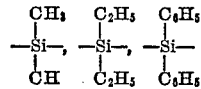

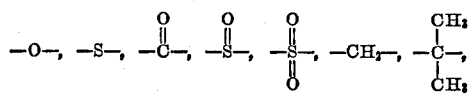

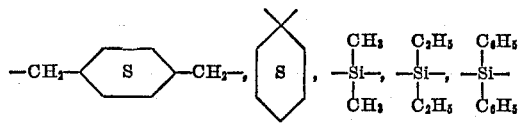

and the like. It is preferred that R' be an aliphatic or aromatic divalent group. It is further preferred that R' contain up to about 18 carbon atoms if R' is aromatic and up to 4 carbon atoms if R' is aliphatic. If R' is a divalent organosilicon group, it is preferred that it contain up to about 12 carbon atoms, most preferably up to 4 carbon atoms. R' is most preferably —$C_6H_4$—.

Illustrative of particular bis(hydroxamoyl halides) are the following:

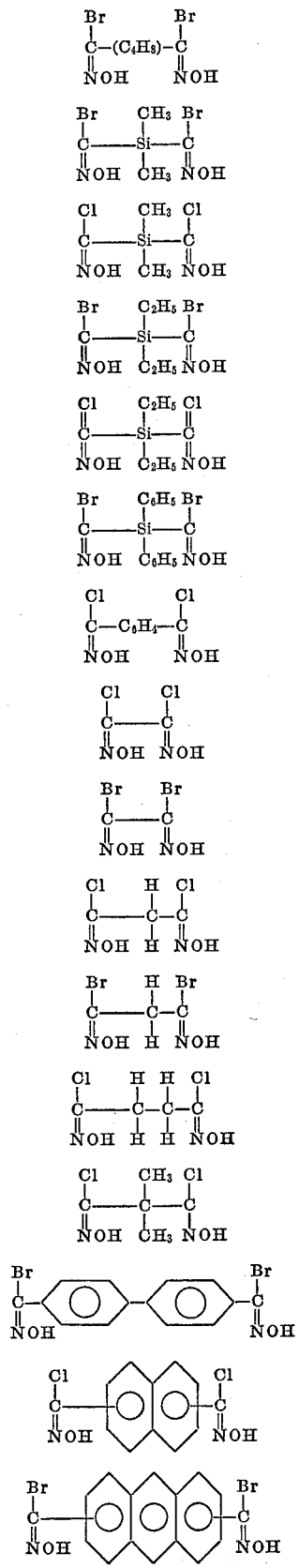
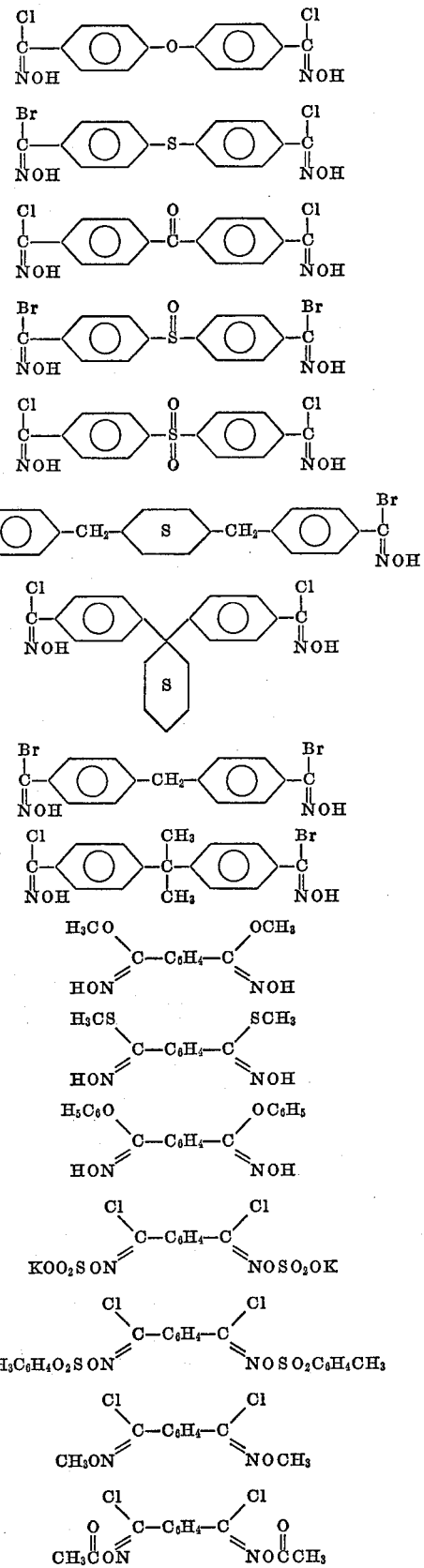

Generally, equimolar quantities of the reactants are used to form the polymers of this invention. However, it is possible to terminate the polymer chains with either hydroxamoyl halide groups or mercapto groups merely by utilizing in the reaction an excess of the reactant containing either of those groups. To obtain relatively high intrinsic viscosity polymer, it is generally preferred that the excess not exceed about 5 mole percent.

When the polymer is terminated by hydroxamoyl halide groups, they may be reacted with compounds or polymers containing at least one group, preferably two groups, which is (are) reactive therewith under the conditions of the reaction. Such groups may be, for example, amines or phenoxides.

When an excess of the dithiol is used, the excess may function as chain-stoppers, or end-blocking units, the terminal mercapto groups of which may serve as reactive groups through which the chain may be further extended by reaction with other compounds containing at least one group, preferably two groups, which is (are) reactive with the mercapto groups under the reaction conditions. Such groups and compounds are, for example, hydroxamoyl halide; isocyanate; halogen, e.g., chlorine and bromine; epoxide, acid chlorides, e.g., adipoyl chloride, carboxy, e.g., adipic acid, tetracarboxy-naphthalene; $SO_2Cl_2$; phosgene (to form a thicarbonate linkage); or phosgenated dithiols (aliphatic or aromatic bis-chloro-carbonates [to form thiocarbonate linkages]).

Of course, it will be obvious to one skilled in the art that mixed polymers may be produced by polymerizing more than one of either or each of the two reactants. These mixed polymers may be either random or alternating and may be formed from using mixtures of different species of either or both reactants, or they may be block polymers, which may be formed by reacting a mercapto-terminated polymer of relatively low molecular weight with a hydroxamoyl halide-terminated polymer of relatively low molecular weight which has itself been formed from a dithiol or hydroxamoyl halide which is different from that used to form the first polymer. The relatively low molecular weight polymers may instead be substantially the same except for the one being mercapto-terminated and the other hydroxamoyl halide-terminated, and possibly differences in molecular weight and configuration.

Cyclization of the polythioesteroxime polymers may be accomplished before or after linking in the manner just described. If cyclization is to be performed before linking, their terminal mercapto groups may need protection before cyclization is conducted. Protection may be accomplished by acetylation. After cyclization the protected groups are reconverted to mercapto groups by hydrolysis before linking.

Although the two reactants could be directly contacted together, especially when one or both are liquids or when the reaction temperature is high enough to melt one or both, it is preferable to conduct the reaction in the presence of a solvent. The solvent may be inert or may function as an acid-acceptor to remove the by-product hydrogen halide formed during the reaction.

Illustrative of the inert solvents which may be used are acetonitrile; nitrated solvents, e.g., nitromethane and nitrobenzene; chlorinated solvents, e.g., methylene chloride, chloroform, carbon tetrachloride, ethylene chloride, and chlorobenzene; $N_2O_4$; the ethers, e.g., tetrahydrofurane, diethyl ether, and dioxane; the esters, e.g., amyl acetate, the lactones, e.g., butyrolactone, ketones, e.g., cyclopentanone and cyclohexanone; acetic acid; polyphosphoric acid; and cresols. Cyclohexanone and polyphosphoric acid are preferred.

If an inert solvent has been used, it is desirable to add the mixture an acid-acceptor such as tertiary amine, e.g., trialkylamines such as trimethylamine, triethylamine, and the like; triethylene diamine; 1,3-dimethyl-amino butane; heterocyclic amines such as pyridine, picolines, lutidines; or an alkali metal or alkaline earth metal hydroxide, bicarbonate, carbonate, or alkanoate (up to 4 carbon atoms), e.g., sodium hydroxide, sodium carbonate, sodium bicarbonate, potassium acetate, etc.

Particularly useful acid-acceptors are those insoluble in the reaction mixture, e.g., melamine, phenylmelamine, dicyanamide, insoluble guanidine derivatives, insoluble basic ion-exchange resins. Preferred are melamine and benzoguanamine. Of course, mixtures of the acid-acceptors may be used. The aforementioned acid-acceptors may be used in conjunction with the following solvents which also function as acid-acceptors.

Illustrative of the solvents which also function as acid-acceptors are dimethylacetamide (DMAc), dimethylformamide (DMF), pyrrolidone, and its alkylated derivatives, e.g., N-methyl-pyrrolidone, dimethyl sulfoxide (DMSO), hexamethylphosphoramide, dialkylanilines, e.g., dimethylaniline and diethylaniline, and the like. DMAc is preferred.

In place of a single solvent in the reaction mixture, there may be used mixed solvent systems containing either or both types of solvents.

In order to minimize undesirable side reactions, it is preferable to use either an acid-acceptor which is insoluble in the reaction mixture, preferably melamine, or to use a soluble amine, but ensure that its instantaneous concentration in the reaction mixture is relatively low, e.g., lower than 0.01 molar concentration—for example, by slowly and continuously adding the acid-acceptor or by incrementally adding small portions. Other ways of inhibiting undesirable side reactions are indicated in the schemata which follow.

The reaction of bis(hydroxamoyl halide) or a derivative with the aromatic dithiol in the presence of an acid-acceptor is generally exothermic and may be conducted at autogenous temperature, or it may be conducted at a constant temperature by the application of the required cooling or heating conditions. The reaction may be conducted at temperatures of from about 0° to about 250° C., preferably about 0° to about 100° C.

The closing of the ring to actually form the PBT type polymers may be accomplished by the appropriate thermal conditions, e.g., by heating the thioesteroxime polymer to a temperature in the range of about 0° C. to 250° C., preferably in the presence of a catalyst, especially an acidic catalyst such as silica gel, silica-alumina, sulfonated polystyrene ion-exchange resins, and polyphosphoric acid. Polyphosphoric acid is the preferred catalyst.

Ring closure may also be accomplished by the reaction of the thioesteroxime polymer with a sulfonyl halide, such as benzene sulfonyl chloride, naphthalene sulfonyl chloride, toluene sulfonyl chloride, methane sulfonyl chloride or other ring closing reagents under appropriate conditions, e.g., about 0° C. to about 90° C. or higher, preferably about 5° C. The aromatic sulfonyl halides are preferred. Toluene sulfonyl chloride is most preferred.

The aromatic dithiols are either readily available or easily prepared by methods which are well-known to those skilled in the art. For example, 4,4'-dimercaptodiphenyl ether may be prepared by reaction of 4,4'-dihalodiphenyl ether with hydrogen sulfide and NaOH.

The bis(hydroxamoyl halide), the other reactant in the novel process of this invention, may be prepared by several routes. For example, the appropriate aliphatic or aromatic dialdehyde, such as terephthalaldehyde or isophthalaldehyde may be reacted with hydroxylamine to form the corresponding bisoxime, which in turn may be reacted with halogen to form the bis(hydroxamoyl halide). Another method of preparing the bis(hydroxamoyl halides) is to start with the appropriate dialkyl aromatic precursor, e.g., any of the isomers of xylene, which may be reacted with nitrosyl halide, preferably in the presence of additional halogen to form the bis(hydroxamoyl halides). Other reagents which may be used in place of the nitrosyl halide per se are a combination of nitric oxide (NO) and haloegn.

This second illustrative method, i.e., the reaction of an appropriate dialkyl aromatic precursor, e.g., m-xylene, with nitrosyl halide, or any one of its aforementioned alternatives, is the preferred method for the preparation of the bis(hydroxamoyl halides). This step in combination with the basic process of this invention, i.e. the reaction of the bis(hydroxamoyl halide) with an aromatic dithiol results in a relatively simple, easy, relatively inexpensive, overall process for the preparation of polythioesteroximes from readily available starting materials. These polythioesteroximes may be converted to PBT type polymers by a ring closure reaction.

The preferred process for the preparation of bis(hydroxamoyl halides) may be conducted at temperatures of from about −10° C. or lower to about 50° C. or higher. The reaction may be conducted at pressures in the range of an atmosphere or more, e.g., up to about 10 atmospheres, preferably from about one to about 5 atmospheres. In view of the corrosive nature of some of the reactants and products, such as nitrosyl halide, it is preferred to conduct the reaction in a reactor fabricated from a material which is inert under the reaction conditions, for example, a glass-lined reactor or one fabricated from titanium or nickel.

To enable the reader to more easily visualize the steps of the invention, the following schemata are set forth, using illustrative reactants. It will be readily apparent to the reader, however, that other reactants mentioned throughout the specification and claims may be used in their stead.

PREPARATION OF THIOESTEROXIME POLYMER FROM BIS(HYDROXAMOYL CHLORIDE)

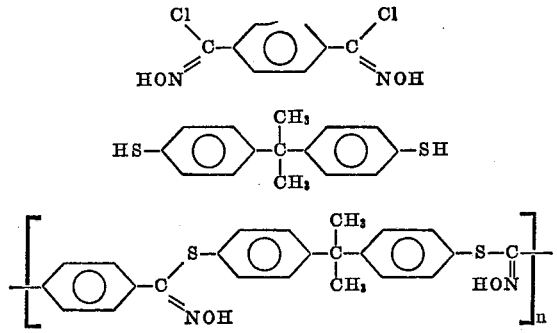

PREPARATION OF POLYBENZOTHIAZOLE FROM THIOESTEROXIME POLYMER

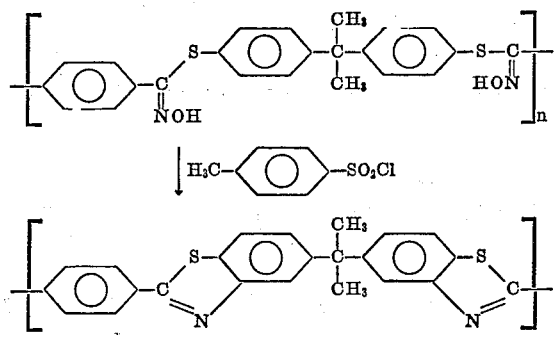

PREPARATION OF BIS(HYDROXAMOYL CHLORIDE) FROM XYLENE

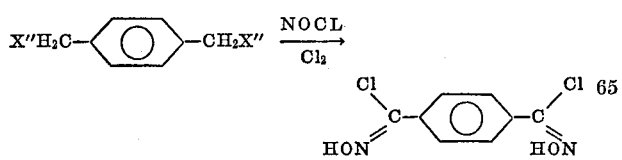

X″ may be hydrogen or chlorine.

Instead of p-xylene in the above illustration, one may instead use another aromatic reactant corresponding to the desired aromatic bis(hydroxamoyl halides) described above.

It is possible that a bis(hydroxamoyl halide) may decompose in the presence of certain acid-acceptors in accordance with the following illustrative side reaction:

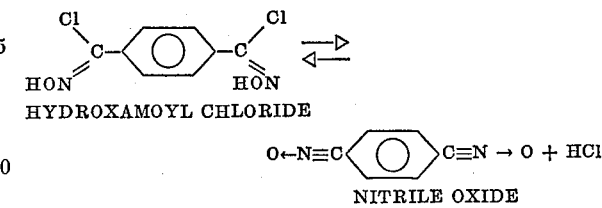

This bis(nitrile oxide) may be used in place of the bis(hydroxamoyl halide), or it may be generated in situ by dehydrohalogenation, e.g., with triethylamine. Bis(nitrile oxides) will then react with the aromatic dithiol to form the thioesteroxime polymers of this invention.

Other alternative reactants which may be used in place of the bis(hydroxamoyl halide) in the reaction to form thioesteroxime polymers are the O-sulfonate derivatives, which may be formed in accordance with the following illustrative schemes.

PREPARATION OF O-SULFONATES OF BIS (HYDROXAMOYL CHLORIDES)

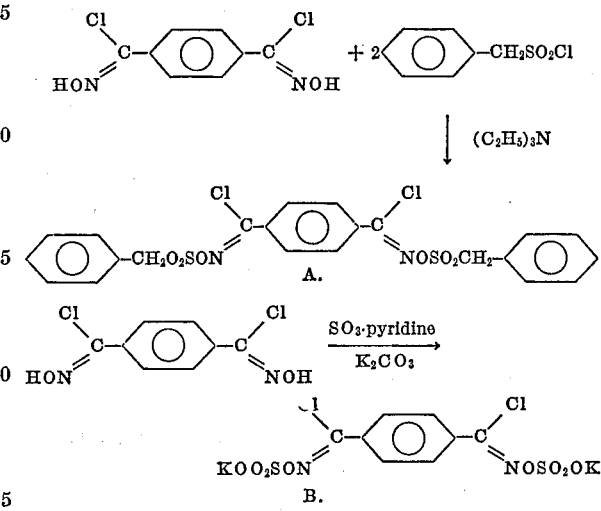

The products in A or B can be reacted with aromatic dithiols or their salts to give thioesteroxime —O— sulfonate polymers which can then be converted to polybenzothiazole (PBT) type polymers in manners analogous to those illustrated above wherein bis(hydroxamoyl halides) have been exemplified as the starting materials.

Example I

To a solution of 25.0 grams (0.1 mole) of p,p′-dimercapto diphenyl sulfide, viz.,

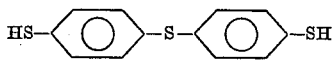

in 300 mls. of dry dimethylacetamide (DMAc) at 25° C. are added 23.3 grams (0.1 mole) of p-phenylene bis(carbohydroxamoyl chloride), i.e., terephthalhydroxamoyl chloride, viz.,

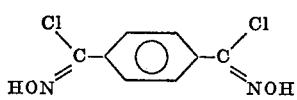

To this solution is added dropwise with stirring over the course of 30 minutes, a solution of 20.2 grams (0.2 mole) of triethylamine in 100 mls. of dry DMAc. Stirring is continued for another hour at 25° C. The viscous solution is now cooled to 5° C. and 41.9 grams (0.22 mole) of toluenesulfonyl chloride, followed by 50 mls. of pyridine, are added with stirring. After standing overnight at 0° to 5° C., the mixture is poured into water and the polybenzo-

Example II

A weight of 16.2 (0.05 mole) of oxydiphenylene-p,p'-bis(carbohydroxamoyl chloride), viz.,

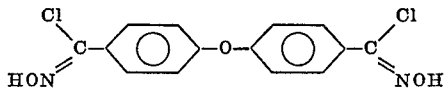

(prepared by reaction of NOCl and Cl₂ on p,p'-dimethyl diphenyl ether), is dissolved in 200 mls. of dry cyclohexanone. To this is added a solution of 7.1 grams (0.05 mole) of 1,3-dimercapto benzene, viz.,

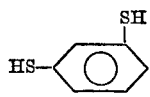

in 200 mls. of dry cyclohexanone. A weight of 12.6 grams (0.10 mole) of melamine is added in portions during 30 minutes and the mixture is stirred at room temperature for an additional period of 2 hours. The polythioesteroxime is washed with hot water and alcohol. The dry polymer is added to 300 mls. of DMAc and the mixture is heated to reflux and cooled to 5° C. A weight of 20.9 grams (0.11 mole) of toluene sulfonyl chloride and 25 mls. of pyridine are added with stirring. The mixture is allowed to stand overnight at 0° C. The polybenzothiazole is washed thoroughly with benzene and is dried in a vacuum oven.

Example III

To a solution of 23.3 grams (0.10 mole) of benzene-1,3-bis(carbohydroxamoyl chloride) of the formula

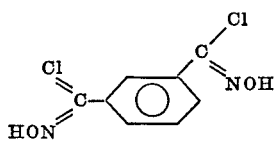

(isophthalhydroxamyl chloride) in 300 mls. of dry DMAc, are added with stirring at room temperature 21.8 grams (0.10 mole) of p,p'-dimercapto biphenyl, viz.,

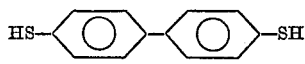

A solution of 20.2 grams (0.20 mole) of triethylamine in 100 mls. DMAc is added gradually over the course of one hour. Stirring is continued for another hour at room temperature. The mixture is cooled to 5° C. and 41.9 grams (0.22 mole) of toluene sulfonyl chloride and 50 mls. of dry pyridine are added with stirring.

After standing in a refrigerator overnight, the mixture is added to a liter of water. The polybenzothiazole is filtered, washed in the usual manner of Example I and dried.

Example IV

A weight of 46.6 grams (0.20 mole) of benzene-1,3 bis-(carbohydroxamoyl chloride) is added to 200 mls. of diglyme. To this is added 83.8 grams (0.44 mole) of benzenesulfonyl chloride dissolved in 200 mls. of diglyme. After cooling to 10° C. in an ice bath, a weight of 44.4 grams (0.44 mole) of triethylamine is added gradually with stirring while keeping the temperature below 10° C. This produces the O-sulfonate of the bis hydroxamoyl chloride,

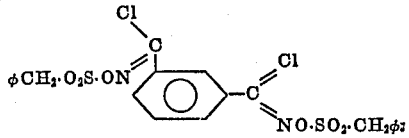

One-tenth mole of this compound (60.5 grams) is then reacted with an equivalent amount of the following dry sodium mercaptide (26.2 grams, 0.1 mole)

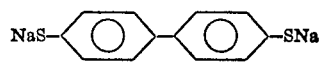

Dry DMAc (500 mls.) is the reaction medium and is maintained at 15° C. Stirring is continued for one hour at 15° C. as the polymer and sodium chloride precipitate out. The reaction mixture is then gradually heated to 70° C. to bring about closure of the thiazole ring with elimination of benzylsulfonic acid. The polybenzothiazole is filtered and washed several times by decantation with hot water, then dilute alkali, water and alcohol followed by drying in a vacuum oven.

EXPERIMENT 1

Preparation of terphthal-bis (N-acetylated hydroxamoyl chloride)

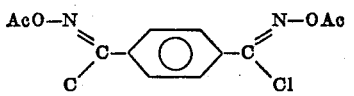

A weight of 4.66 grams (0.02 mole) of terephthal-bis (hydroxamoyl chloride) was dispersed in a mixture of 25 mls. of acetic acid and 25 mls. of acetic anhydride. Two drops of conc. H₂SO₄ were added. The compound slowly dissolved, and a slight exotherm occurred as acetylation took place. There resulted a clear solution at about 35–40° C.

When the solution was cooled, crystals readily came out. These were collected and washed with petroleum ether. There were obtained 5.7 grams of product, or 90% yield of the acetylated derivative.

The acetylated derivative melted at 152° C. The elemental analyses were as follows:

Calcd. for $C_{12}H_{10}N_2O_4Cl_2$ (percent): C, 41.0; H, 3.44; N, 9.56; O, 21.8; Cl, 24.2. Found (percent): C, 45.3; H, 3.09; N, 8.69; O, 20.3; Cl, 23.5.

What is claimed is:

1. A process for the preparation of thioesteroxime polymers which comprises reacting:

(A) an alkali metal di-salt of an aromatic dimercapto compound having the formula:

—M'S—Y—SM'— wherein M' is lithium, sodium or potassium, and Y is

—C₆H₄—, —C₁₀H₆—, —C₁₄H₈—, —C₆H₄—C₆H₄—, or —C₆H₄—R—C₆H₄—, wherein R is

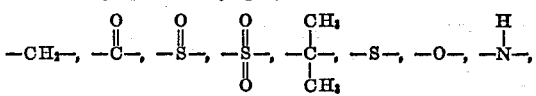

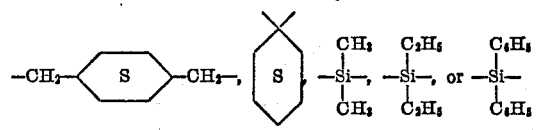

with (B) a bis(hydroxamoyl halide) having the following formula:

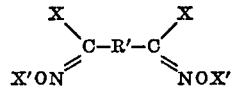

wherein X is halogen, —OC₆H₅, —OR" or SR" (R" being alkyl containing up to 4 carbon atoms); R' is a direct bond or a divalent aliphatic, aromatic or an organosilicon group selected from the group consisting of

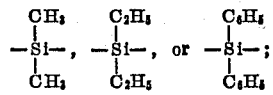

and X' is hydrogen, an

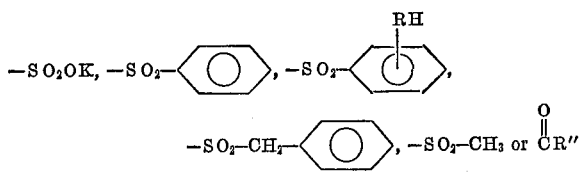

group, at a temperature of from about 0° to about 250° C. for a period of time sufficient to form the polymer.

2. The process of claim 1 wherein the bis(hydroxamoyl halide) has the formula:

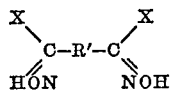

wherein X is halogen and R' is a divalent aliphatic, aromatic or an organosilicon group selected from the group consisting of

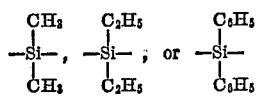

3. The process of claim 2, wherein X is bromine or chlorine and R' is a divalent aliphatic or aromatic group.

4. The process of claim 3 wherein R' is a divalent aliphatic group containing up to about 4 carbon atoms or a divalent aromatic group containing up to about 18 carbon atoms.

5. The process of claim 1 wherein the aromatic dimercapto compound or its alkali metal di-salt contains up to about 30 carbon atoms.

6. The process of claim 1 wherein the aromatic dimercapto compound or its salt contains up to about 20 carbon atoms.

7. The process of claim 6 wherein there is used a dilithium, disodium or dipotassium salt of the aromatic dimercapto compound.

8. The process of claim 1 wherein an acid-acceptor is present during the reaction.

9. The process of claim 8 wherein the acid-acceptor is melamine, dicyanamide or benzoguanamine.

10. The process of claim 1 wherein there is present during the reaction a solvent selected from the group consisting of acetonitrile, nitromethane, nitrobenzene, methylene chloride, chloroform, carbon tetrachloride, ethylene chloride, chlorobenzine, N₂O₄, tetrahydrofurane, diethyl ether, dioxane, amylacetate, butyrolactone, cyclopentanone, cyclohexanone, acetic acid, polyphosphoric acid and cresols.

11. The process of claim 10 wherein the solvent is cyclohexanone.

12. The process of claim 1 wherein there is present during the reaction a solvent which also functions as an acid-acceptor, selected from the group consisting of dimethylacetamide, dimethylformamide, pyrrolidone, N-methylpyrrolidone, dimethyl sulfoxide, hexamethylphosphoramide, and N,N-dimethylaniline.

13. The process of claim 1 wherein the reaction is conducted at a temperature of from about 0° C. to about 100° C.

14. The process of claim 1 wherein the bis-hydroxamoyl halide) is prepared by reacting a dialkyl aromatic compound with nitrosyl halide for a period of time sufficient to form the product.

15. The process of claim 14 wherein the nitrosyl halide is nitrosyl chloride or nitrosyl bromide.

16. The process of claim 14 wherein the temperature of the reaction is from about −10° C. to about 50° C.

17. The process of claim 1 wherein the bis(hydroxamoyl halide) is prepared by reacting an aliphatic or aromatic dialdehyde with hydroxylamine to form the corresponding bisoxime, which is then reacted with halogen to form the bis(hydroxamoylhalide), each reaction step being conducted at a temperature of from 0° to 100° C.

18. The process of claim 1 wherein the thioesteroxime polymers are contacted with a sulfonyl halide selected from the group consisting of benzene sulfonyl chloride, toluene sulfonyl chloride, naphthalene sulfonyl chloride, or methane sulfonyl chloride, at a temperature of about 0° C. to about 90° C. for a period of time sufficient to convert at least some of the thioesteroxime groups to benzothiazole groups.

19. A film forming polythioesteroxime polymer consisting essentially of repeating units of the formula:

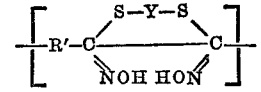

wherein R' is a direct bond or a divalent aliphatic, aromatic or organosilicon group selected from

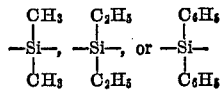

and Y is —C₆H₄—, —C₁₀H₆—, C₁₄H₈—, —C₆H₄—C₆H₄
wherein R is —CH₂—,

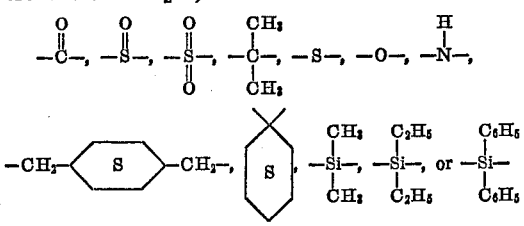

20. The polythioesteroxime of claim 19 wherein R' is a divalent aliphatic radical containing up to about 4 carbon atoms.

21. The polythioesteroxime of claim 19 wherein R' is a divalent aromatic radical containing up to about 18 carbon atoms.

References Cited
UNITED STATES PATENTS

| | | | |
|---|---|---|---|
| 3,268,545 | 8/1966 | Litt et al. | 260—307 |
| 3,424,720 | 1/1969 | Rudner et al. | 260—47 |
| 3,560,438 | 2/1971 | Burton et al. | 260—47 |

WILLIAM H. SHORT, Primary Examiner

L. LEE, Assistant Examiner

U.S. Cl. X.R.

260—2 R, 2 S, 30.2, 30.6 R, 30.8 DS, 31.2 N, 32.4, 32.6 N, 32.8 N, 33.2 R, 47 R, 49, 79.3 R, 448.2 B, 448.2 N, 453 R, 456 A, 488 CD, 566 D